Nov. 3, 1953  J. A. DE ARMAS  2,657,596
LENS DRILLING MACHINE
Filed Aug. 14, 1950  4 Sheets-Sheet 1
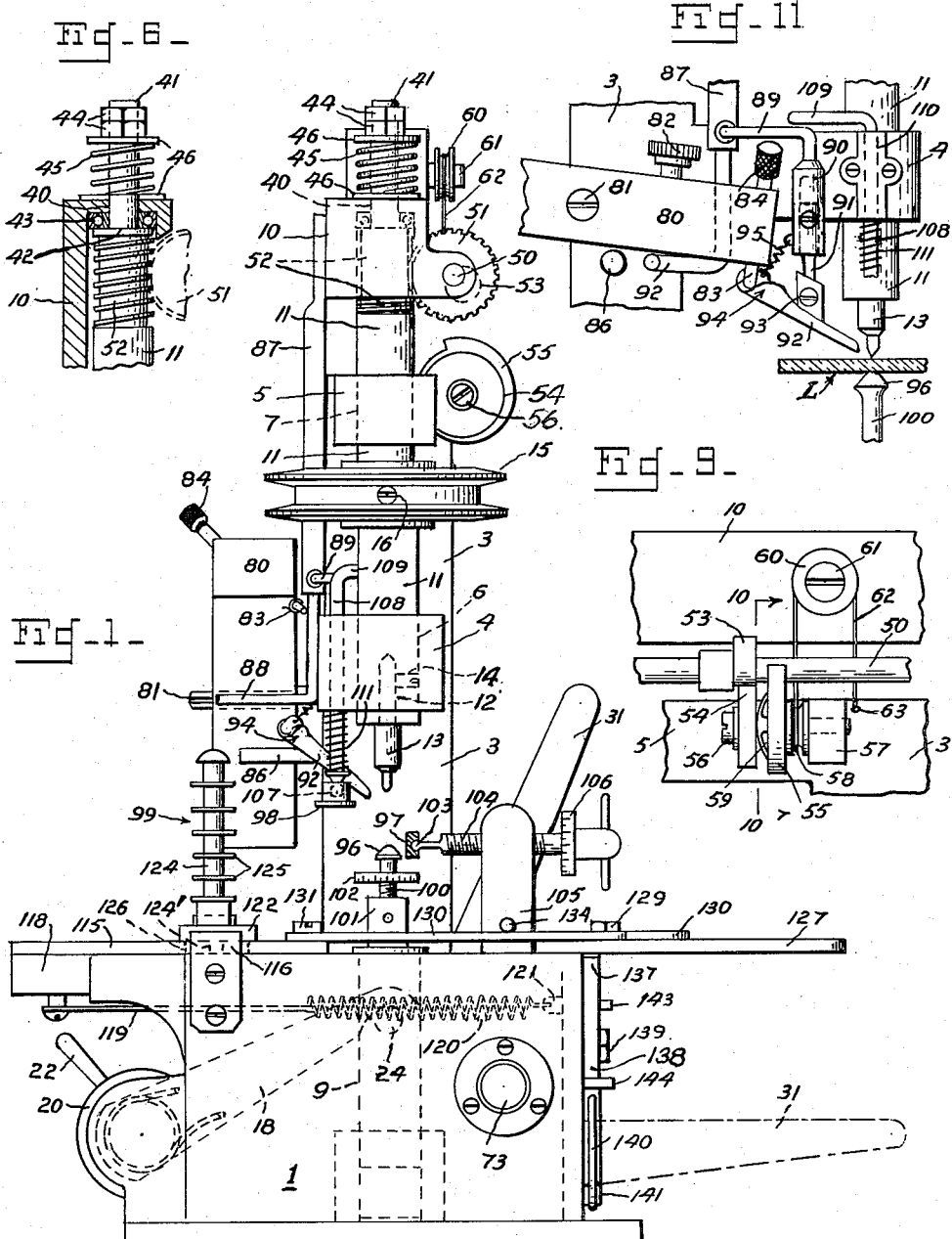
INVENTOR
Justo Antonio de Armas
BY
ATTORNEY

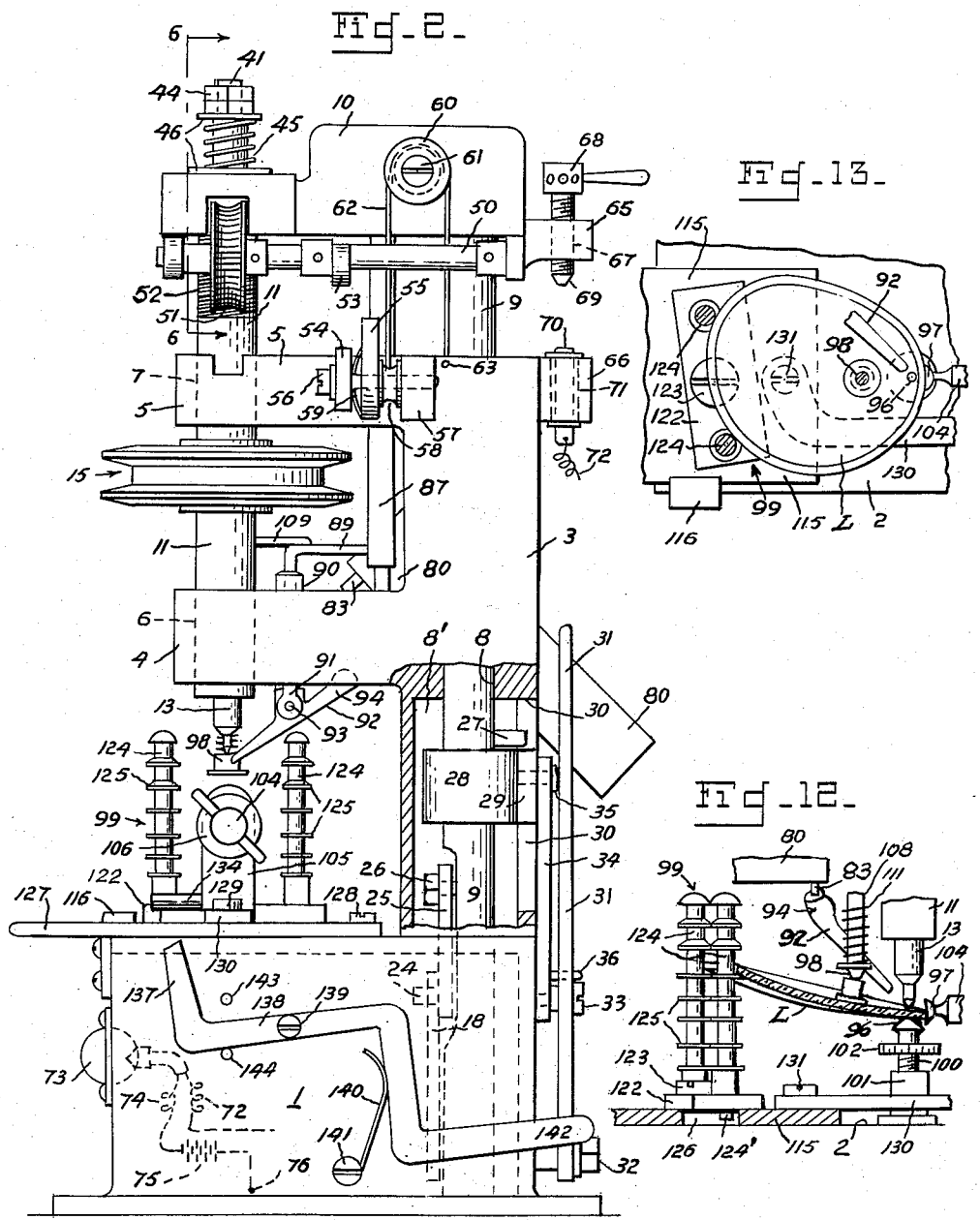

Nov. 3, 1953   J. A. DE ARMAS   2,657,596
LENS DRILLING MACHINE
Filed Aug. 14, 1950   4 Sheets-Sheet 3
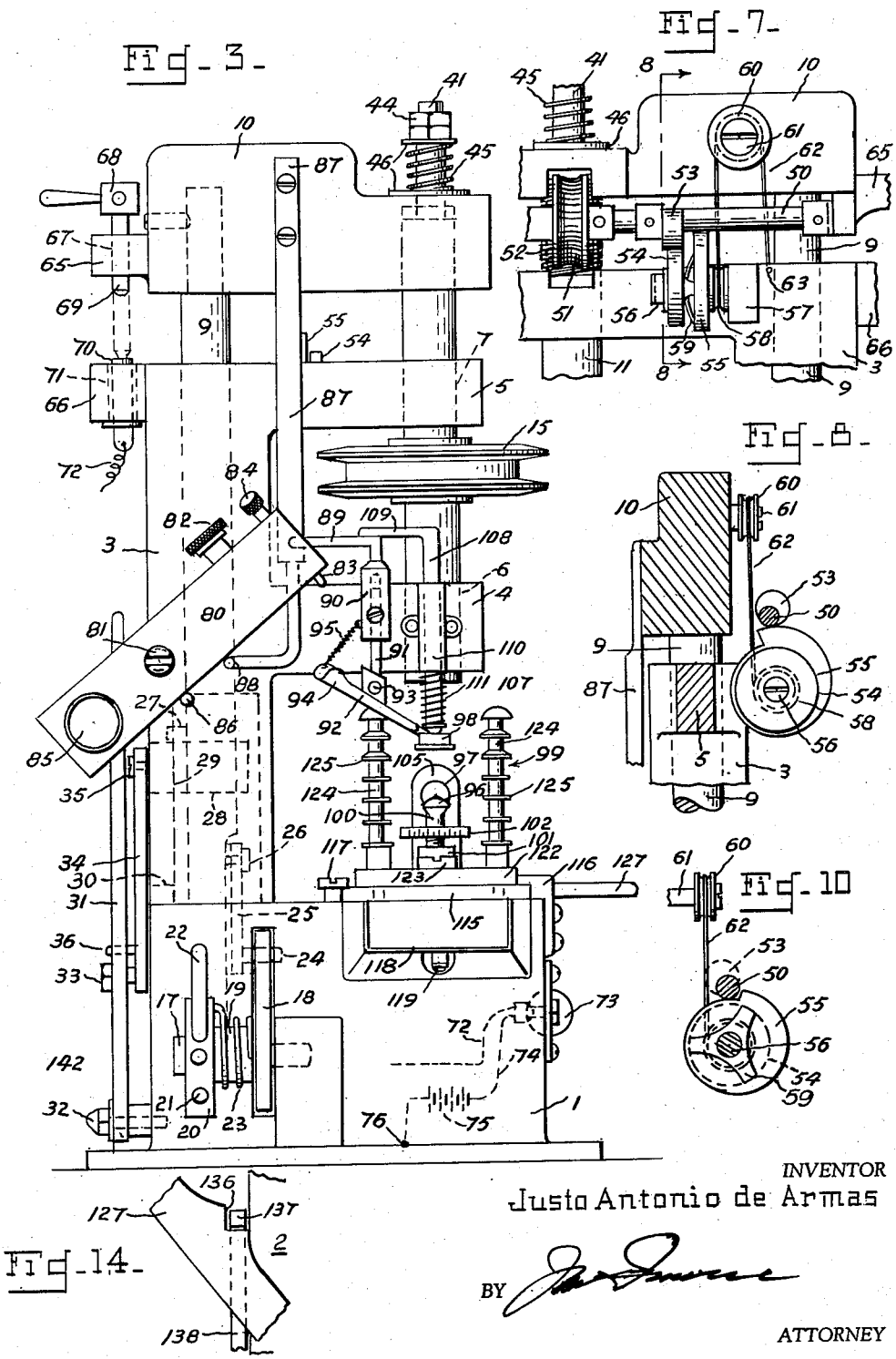
INVENTOR
Justo Antonio de Armas
BY
ATTORNEY

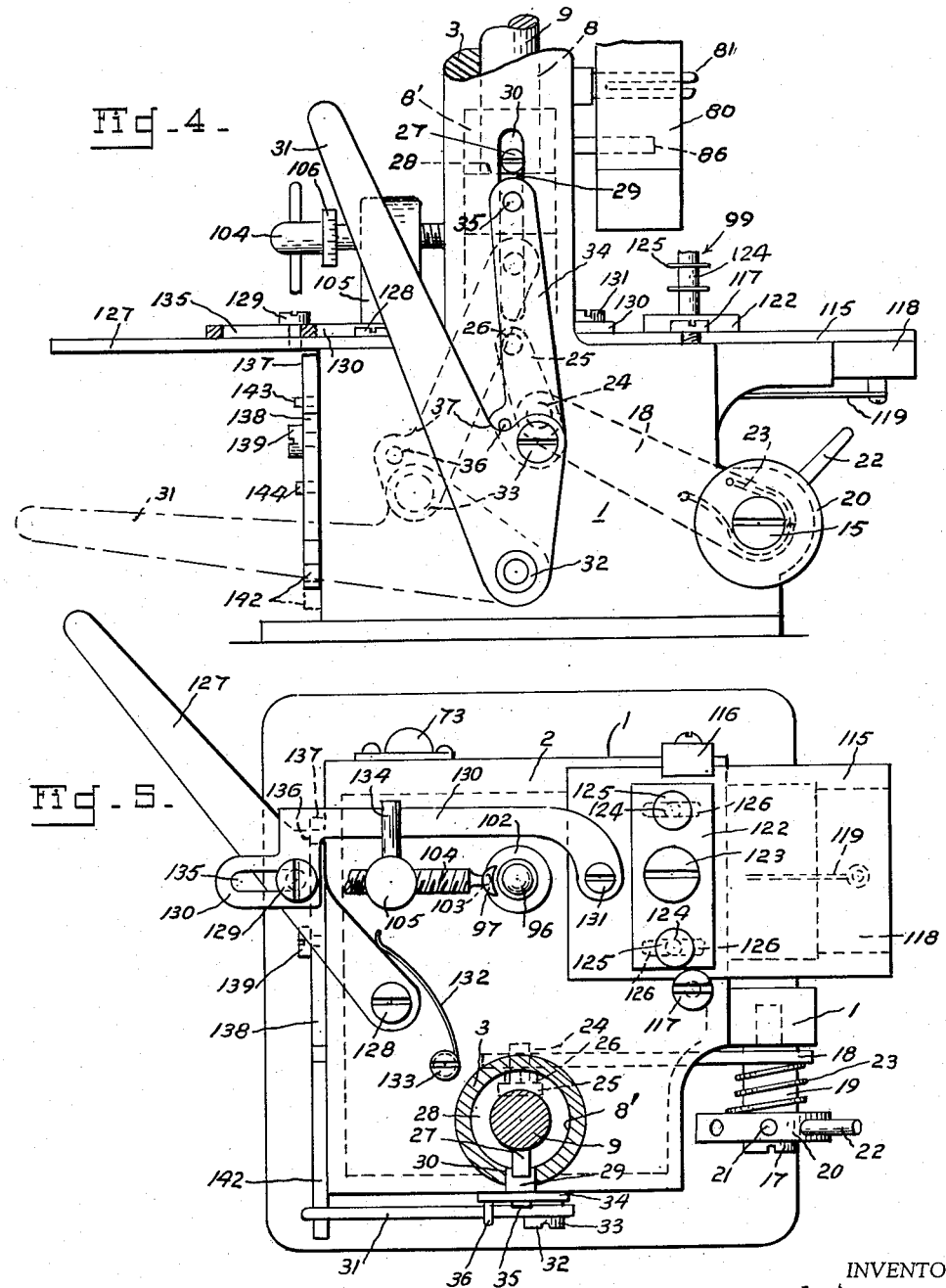

Patented Nov. 3, 1953

2,657,596

UNITED STATES PATENT OFFICE 2,657,596

LENS DRILLING MACHINE

Justo Antonio de Armas, Havana, Cuba

Application August 14, 1950, Serial No. 179,220

12 Claims. (Cl. 77—55)

This invention relates to drilling machines, and more particularly to machines for drilling lenses, glass, crystals, or the like.

The machines presently employed for drilling holes in lenses or the like are manually controlled in the operation of applying the drill to the lens. In the usual machine the drill is moved to and from the lens by a manually operable lever. Due to this manual movement of the drill to the lens, there is a considerable variance of pressure and improper application of the drill which causes substantial losses by cracking or chipping the lens. In using these drills the operator normally applies the drill to one side of the lens and bores partially therethrough and then inverts the lens and bores from the other side. Because of the danger of damage to the lens, the operator will usually not bore completely through the lens, or if he does permit the drill to move through the length of its stroke, the operator is not aware of the completion of the stroke. In the one case the bore is not fully completed and must be reamed out to remove the portions between the ends of the two partial bores, and in the latter case the operator is not aware of the completion of the stroke of the drill.

In the operation of these machines it is customary to apply a lubricant to the point of contact between the drill and the lens to cool the parts and to float particles from the bore. Normally this lubricant is applied manually, a drop at a time, and consequently it frequently occurs that there is insufficient lubrication, which permits heating and cracking of the lens. Furthermore, in the usual machines the lenses are positioned relative to the drill by an adjustable support and chuck. This requires the adjustment of the support for each lens, due to the variation in curvature of the lenses and, in addition, the chuck arrangement does not accommodate variations in the formation of the edge of the lens, so that frequently the holes drilled in a lens will not be uniform distances from the edge.

Having in mind the defects of the prior art apparatus, it is an object of the present invention to provide a drilling machine particularly adapted for drilling lenses and the like, and which is automatically operative to apply the drill to the work, such as a lens, with a gradual increase of pressure or movement of the drill toward the work.

It is another object of the invention to provide a drilling machine particularly adapted for drilling lenses which automatically applies the drill to the lens with a gradual movement of the drill toward the lens but automatically reciprocates the drill to remove loose particles from the bore.

It is still another object of the invention to provide a drilling machine particularly adapted for drilling lenses having means for visually indicating when the drill has moved completely through its boring stroke.

It is a further object of the invention to provide means for automatically applying a constant supply of lubricant to the work at its point of contact with the drill.

It is a still further object of the invention to provide a drilling machine comprising means for automatically supplying a selected amount of lubricant to the work at the point of contact with the drill only during the actual drilling operation.

It is an additional object of the invention to provide a lens drilling machine having self-aligning lens support and chuck means.

It is a still further object of the invention to provide a drilling machine wherein the work support is automatically locked in position upon application of the drill to the work and automatically released upon withdrawal of the drill from the work.

Moreover, it is an object of the invention to provide a drilling machine particularly adapted for drilling lenses or the like and which embodies simplicity of organization, economy of construction, and efficiency in operation.

The novel features that are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawings, wherein like reference characters indicate like parts throughout and in which:

Figure 1 is a front view in elevation of a drilling machine in accordance with the present invention;

Figure 2 is a side view in elevation taken from the right of Figure 1, a part of the housing being broken away;

Figure 3 is a side view in elevation taken from the left in Figure 1;

Figure 4 is a partial rear view in elevation showing the lower part of the apparatus;

Figure 5 is a plan view of Figure 4;

Figure 6 is a fragmentary cross-sectional view taken on line 6—6 of Figure 2;

Figure 7 is a fragmentary view in elevation corresponding to Figure 2, but with the drill head moved to operative position;

Figure 8 is a cross-sectional view taken on the line 8—8 of Figure 7;

Figure 9 is a fragmentary view corresponding to Figure 7, but with the parts in different operative relation;

Figure 10 is a cross-sectional view taken on line 10—10 of Figure 9;

Figure 11 is a fragmentary view in elevation corresponding to Figure 3, with the lubricating apparatus in operative position;

Figure 12 is a fragmentary view of the lens holding and supporting means in operative relation;

Figure 13 is a plan view of the parts shown in Figure 12; and

Figure 14 is a fragmentary plan view corresponding to Figure 5 and showing the work holding control lever with its lock in operative position.

Referring now to the drawings, specifically to Figures 1-3, a typical drilling machine, particularly for drilling lenses, is shown as comprising a base 1 surmounted by a work table 2 with a standard 3 rising at the rear thereof, and rigidly supporting a pair of horizontally disposed arms 4 and 5 overlying the work table 2. The arms 4 and 5 have axially aligned bearings 6 and 7 respectively in their outer ends and the standard 2 has a vertical bore 8. A support rod 9 is slidably fitted in the bore 8 and extends above the top of the standard 3 to support a cross-head 10 which overlies the arms 4 and 5. A drill shaft 11 is rotatively suspended from the cross-head 10 and is journalled in the arm bearings 6 and 7. The drill shaft 11 has a bore 12 in its lower end for removably seating a drill 13 that is secured by a set screw 14. A drive pulley 15 is secured to the drill shaft 11 by a set screw 16 and, in operation, is driven by a belt (not shown) from any suitable source of power.

Broadly, the foregoing apparatus is typical of most drilling machines, particularly lens drilling machines. Usually, the support rod 9 is biased upwardly by a spring which will lift the whole movable carriage including rod 9, cross-head 10 and drill shaft 11. The work is supported on the work table 2 beneath the drill 13. Then, in operation, the operator manually lowers the carriage, usually by a lever and linkage connected with the rod 9, and manually presses the drill 13 against the work.

In contrast to the foregoing construction and operation, the present invention contemplates controlling the resilient depression of the drill carriage and mechanically limiting this depression through a gradually increased cycle, as will now be described.

Referring to Figures 3-5, it will be seen that a screw 17 is threaded into the base 1 and carries a sleeve 19 and disc 20, a lever 18 being pivotally mounted at one end on the sleeve 19. The disc 20 has a plurality of peripherally spaced radial sockets 21 for selectively receiving a crank pin 22, and a spring 23 is coiled about the sleeve 19 and has its ends respectively anchored to the lever 18 and disc 20 so as to bias the lever 18 downwardly when the disc 20 is locked by the compression of the screw 17. Obviously, the tension of the spring 23 may be adjusted by turning the disc 20 about the screw 17 by the crank 22. The lever 18 is connected at its free end by a pivot 24 to a link 25 which, in turn, is connected by a pivot 26 to the support rod 9, as best shown in Figure 2, whereby the rod 9 and drill carriage is resiliently pulled down by the lever 18.

In order to lift the drill carriage to inoperative position, referring now to Figures 2 and 4, the standard 3 is hollowed at its base to provide a cavity 8' that will accommodate a pin 27 fixed in the rod 9 and extending radially therefrom for cooperation with a collar 28 that is slidable on the rod 9. The collar 28 carries a slide block 29 that rides in a slot 30 opening from the cavity 8' through the rear of the standard. A control lever 31 is mounted on the base 1 by a pivot 32 and is connected by a pivot 33 to one end of a link 34 which has its opposite end connected by a pivot 35 to the slide 29. To lift the drill carriage, the lever 31 is elevated until its pivot 33, with the link 34, passes over center, whereupon the lever and link are locked by a pin 36 on the link 34 seating in a recess 37 in the lever 31. When the lever 31 is swung up, it raises the link 34 which, by means of pivot 35 and slide 29, lifts the collar 28 to engage the pin 27 and raise the rod 9 and drill carriage supported thereby. On the other hand, when the lever 31 is swung down, it lowers the collar 28 and the drill carriage is lowered to operative position, the carriage being lowered by both gravity and the action of the coiled spring 23 through the lever 18.

In the usual drilling machine, the drill shaft 11 is journalled in and suspended from the cross-head 10 by a peripheral thrust bearing. After some usage however, this bearing becomes worn and permits some play, particularly axial movement, in the drill shaft. This play is very harmful, especially in machines for drilling lenses and glass, because it permits the drill 13 to reciprocate and impact the work, and this results in chipped and cracked work. To eliminate such play, the shaft 11 is resiliently and adjustably suspended, as best shown in Figure 6. The cross-head 10 is provided with a bore 40 opening through its top and the drill shaft 11 has a stem 41 of reduced diameter which smoothly fits in and extends up through the bore 40. The reduced stem 41 provides a shoulder 42 about the drill shaft 11 and a suitable thrust bearing 43 is interposed about the stem 41 between the shoulder 42 and bottom of the cross-head 10. The upper end of the stem 41 is threaded to receive lock nuts 44, and a coil spring 45 is interposed about the stem 41 between a pair of washers 46 respectively bearing on the bottoms of the lock nuts 44 and the top of the cross-head 10. By this arrangement, the spring 45 holds the shaft shoulder 42 snugly against the bearing 43 and cross-head 10, and in the event of wear, any play may be taken up by threading down the lock nuts 44 to increase the tension on the spring 45.

When the drill carriage is lowered, the drill 13 is pressed, by spring 23, against the work on the work table 2. In order to limit the downward pressure and to reciprocate the drill 13, however, a cam mechanism is interposed between the drill carriage and support. As best shown in Figures 1 and 2, a shaft 50 is horizontally journalled on the cross-head 10 and has a worm wheel 51 fixed thereon. As best shown in Figure 6, the worm wheel 51 is operatively engaged with a worm gear 52 carried by the upper end of the drill shaft 11. Thus the cross-shaft 50 is driven at a reduced speed through the worm gear 52 and wheel 51 from the drill shaft. The cross-shaft 50 has a cam 53 fixed thereon (see Figures 2 and 7-10) and this cam rides on top of and is supported by a roller 54 that is journalled in fixed relation on the upper part of the fixed supporting structure. Consequently, as the cam 53 revolves with the shaft 50, and rides on the roller 54, it vertically reciprocates the cross-head 10 and drill carriage so that the drill 13 is constantly and uniformly moved to and from the work to clean the drilled bore in the work.

In addition to this reciprocal movement of the drill carriage, the shaft 50 also cooperates with a spiral cam 55 in limiting, through a progressive cycle, the movement of the drill carriage toward the work. The roller 54 and spiral cam 55 are coaxially journalled on a screw 56 that is threaded into a bracket 57 on the arm 5 or standard 3. The spiral cam 55 has a sheave 58 fixed thereto and a spring 59, preferably of the spring washer type, is interposed between the roller 54 and spiral cam 55. The spring 59 is tensioned by adjustment of the supporting screw 56 and biases the spiral cam 55, through its sheave 58 in the illustrated arrangement, into frictional engagement with the bracket 57. A pulley 60 is freely journalled on a pivot 61 carried by the cross-head 10, the pulley 60 being aligned with and above the sheave 58, and a flexible cable or chain 62 passes over the pulley 60 and has one end anchored to the sheave 58 and the other end anchored at 63 to the fixed support 3—5.

It will be seen in Figures 1 and 2 that when the drill carriage is in elevated inoperative position, that is when the lever 31 is in its up position, the cross-head 10 is spaced above the arm 5 and top of the standard 3 so that the cross-shaft 50 and cam 53 are spaced above the spiral cam 55 and roller 54 respectively. Of course the cross-shaft 50 may be continuously driven even though in inoperative position as the drill shaft 11 is usually continuously driven during operation of the machine. Upon the elevation of the cross-head 10, the pulley 60 will be lifted, which will pull the cable 61 from the sheave 58, thereby rotating the sheave to properly position the spiral cam 55. When the drill carriage is lowered to operative position, by swinging down the lever 31, the cross-head 10 is lowered until the cross-shaft 50 rests on the periphery of the spiral cam 55 as shown in Figures 7 and 8. Obviously, when the drill carriage is first lowered, the drill 13 makes the initial contact with the work and, consequently, the lowering of the drill and its contact with the work should be most limited. Therefore, when the drill carriage is lowered, the spiral cam 55 should be positioned to present its greatest radius uppermost toward the shaft 50, as best shown in Figure 8. Accordingly, the cable or chain 62 is of a selected length and so attached to the sheave 58 that it will rotate the spiral cam to starting position with its greatest radius uppermost when the cable 62 is extended by the elevation of the pulley 60.

When the drill carriage is lowered, the drill shaft and cross shaft 50 are being driven. Consequently, when the cross-shaft 50 comes to rest on the top of the spiral cam 55, the drill 13 then merely engaging the work, the rotating shaft 50 drives the spiral cam 55 by frictional peripheral engagement so that the shaft 50, and drill carriage supported thereby, is gradually lowered by the gradually decreasing radius of the cam 55, and, therefore, the drill 13 is gradually lowered into the work. With each revolution of the shaft 50, however, the cam 53 thereon revolves into engagement with the roller 54 and, as the maximum radius of the cam 53 is greater than that of the spiral cam 55, the cam 53 reciprocates the drill carriage and lifts the drill 13 from the work to thereby withdraw particles from the drill bore in the work.

When the carriage is lifted by the cam 53, the shaft 50 is removed from engagement with the spiral cam 55, and because of the friction braking action between the spiral cam 55 and bracket 57 by the spring 59, the spiral cam 55 stops immediately upon disengagement with the shaft 50. Consequently, when the shaft 50 is again lowered onto the spiral cam, by the continued revolution of the reciprocal cam 53, the drill 13 is lowered to the exact point, and no deeper in the bore, that it had reached before being retracted by means of the reciprocal cam 53. Thus the operation will continue, the drill being intermittently reciprocated by the cam 53 engaging the roller 54 of uniform radius to clean the drill bore, and the drill being gradually lowered between each reciprocation only by the shaft 50 engaging and driving the spiral cam of continuously decreasing radius.

The foregoing operation will continue until the drill carriage is lowered to the smallest radius of the spiral cam 55, as shown in Figures 9 and 10. It will be noted that as the spiral cam 55 is rotated, the sheave 58 will also rotate and wind the chain or cable 62 thereon. This chain 62 is of selected length that will permit rotation of the cam 55 only until the smallest radius of the cam is facing the shaft 50 and thereafter each reciprocal elevation of the head 10 and pulley 60 by the cam 53 will pull back on the chain 62 to partially return the spiral cam 55. By this means, the radial shoulder of the cam 55 will never pass under the shaft 50 to re-engage the greatest radius with the shaft 50. Moreover, when a complete cycle of operation has finished and the drill carriage is again elevated to inoperative position, by the lever 31, the pulley 60 withdraws the chain 62 from the sheave 58 and revolves the spiral cam 55 back to starting position, that is, with its greatest radius uppermost.

Although the drill carriage is limited in its downward movement by the spiral cam 55, the carriage may also be limited by the usual adjustable abutment which in the present instance serves a dual function. A bracket 65 is fixed to the drill head 10 and overlies a bracket 66 rigid with the standard 3. The head bracket 65 has a threaded bore 67 within which a screw 68 is threaded, the lower end 69 of which protrudes below the bracket 65 for abutment with the bracket 66 and thereby limit downward movement of the head 10. According to the present invention, an abutment 70 is mounted in the bracket 66 for cooperation with the screw end 69, and this abutment 70, as shown in Figures 2 and 3, also comprises an electric contact which is surrounded by an insulating sleeve 71. The contact 70 is connected by an electric conductor 72 with a signal 73, such as a lamp, that is mounted in the front of the base 1. The signal 73 is connected by a conductor 74 to a suitable source of electric supply 75 which in turn is grounded to the machine as at 76 to thereby complete the circuit through the ground when the screw 68 abuts and grounds the contact 70. Thus, when the head 10 is lowered to the limit imposed by the screw 68, a circuit is completed through the signal 73 to inform the operator that the operation is completed.

In drilling operations, particularly in drilling lenses, it is necessary to lubricate the drill and bore in the work to cool the work and drill and to float particles from the bore. Accordingly, as best shown in Figures 3 and 11, an elongated lubricant reservoir 80 is mounted off center on a pivot 81 that is fixed on one side of the standard 3. This reservoir has its longer end toward the front of the machine and in the end has a filling opening and closure 82 and a dispensing spout 83 that is controlled by a valve screw 84, and a sight gauge 85 is in the opposite end of the reservoir. A stop 86 is fixed on the standard 3 to limit the downward tilting of the longer dispensing end of the reservoir.

The reservoir 80 is pivotally mounted to limit its discharging only during the drilling operation by swinging the discharge end up and down in accordance with the movement of the drill carriage between inoperative and operative positions. This is accomplished by means of an arm 87 depending from the drill head 10 and terminating in an outwardly extending branch 88 that engages the underside of and supports the longer end of the reservoir 80. Therefore, when the drill head 10 is raised to inoperative position, by lifting the lever 31, it lifts the arm 87 and the branch 88 swings the reservoir 80 up so that the discharge spout 83 is elevated above the normal level of the lubricant in the reservoir. Conversely, when the drill head 10 is lowered to operative position, the arm 87 is also lowered and the branch lowers the reservoir 80 until it engages the stop 86, whereupon the discharge spout 83 is below the lubricant level and will be discharged through said spout.

In order to convey the lubricant from the spout 83 directly to the drill and drill bore in the work, the arm 87 has a branch 89 that terminates in a depending socket 90. A small rod 91 is adjustably secured in the socket 90 and supports a trough 92 at its lower end by a pivot 93. The trough 92 has an enlarged end 94 for receiving the spout 83 and thereby receive and convey lubricant from the spout 83 to the surface of the work. A light spring 95 may be provided to bias the free end of the trough 92 downwardly so that it will engage the surface of the work. For convenience of illustration, the spring 95 is shown as coupled between the enlarged end 94 of the trough and the socket 90. It will be seen that the trough 92 is also raised and lowered with the arm 87 and drill head 10, and that the reservoir 80 will be swung up and down with each reciprocation of the carriage by the cam 52 so that the spout 83 will automatically engage trough end 94 to intermittently supply one drop at a time.

To readily mount the work, specifically a lens, in proper position on the work table 2 beneath the drill 13, the present invention comprises a chuck mechanism including a conical rest 96, an edge-engaging chuck 97, a resiliently supported pad 98 for holding the lens on the rest 96, and a self-aligning support 99 for supporting the lens opposite the chuck 97, as best shown in Figures 1-3, 5 and 11-13. The conical rest 96 is axially aligned with the drill 13 and is carried by a post 100 that is adjustably threaded in a socket 101 and secured by a lock nut 102, the socket 101 being mounted directly on the work table 2. The edge-engaging chuck 97 comprises a cap or pad like member that is universally mounted on a knuckle or ball 103 on the end of a screw 104 that is horizontally threaded through a standard 105 rising from the work table 2. The screw 104 may be secured by a lock nut 106. The universal mounting 103 permits the chuck 97 to be self-adjusted to any angle of the lens edge so that the holes bored by the drill will always be equidistant from the edge of the lens.

The pad 98 is also universally mounted, by means of a ball and socket knuckle 107, on the lower end of a rod 108. This pad is universally mounted to accommodate different surface curvatures of the lenses, as illustrated in Fig. 12. In addition, the pad 98 is adapted to be elevated with the drill carriage to facilitate the mounting of the lenses in position. The rod 108 is slidably and non-rotatably mounted in a sleeve 110 carried by the support arm 4, and this rod terminates at its upper end in a lateral extension 109 which overlies the branch 89 of the arm 87 carried by the drill head 10. A coil spring 111 is interposed around the rod 108 between the pad 98 and sleeve 110 to bias the pad 98 and rod 108 downwardly. Thus when the drill head 10 is lifted to inoperative position, the branch 89 of the arm 87 is raised and engages the extension 109 and lifts rod 108 and pad 98, as shown in Figure 3, and when the head 10 is lowered to operative position the spring 111 biases the pad 98 down onto the lens L on the rest 96, as shown in Figure 12.

The self-aligning support 99 comprises a bed 115 that is slidably mounted on the work table 2 in guides 116 and 117. A block 118 is fixed to the underside and at the outer end of the bed 115 for abutment with the base 1 to limit the movement of the bed toward the rest 96, and a link 119 is secured to the block 118 at one end and passes into the base and is secured at the other end to a spring 120 that is anchored at 121 to the base 1, as best shown in Figure 1, to bias the bed 115 inwardly to the limit imposed by the block 118. A block 122 is pivotally mounted by a pin 123 on the bed 115 and this block 122 carries a pair of upright posts 124 which are provided with a plurality of spaced radial flanges 125. The posts 124 are adapted to engage the edges of the lens L opposite the chuck 97 so that the lens is triangularly supported, and the flanges 125 form slots or grooves for receiving and supporting the edges of the lens L according to its curvature, as shown in Figures 12 and 13. The lower ends 124' of the posts 124 extend below the block 122 to ride in slots 126 in the bed 115 and thereby limit the pivotal movement of the block 122, as best shown in Figures 5 and 12.

The bed 115 is manually moved away from the chuck for mounting the lens L by means of a lever 127 mounted on a pivot 128 on the table 2. This lever 127 is connected by a pivot 129 with a link 130 that in turn is connected by a pivot 131 with the bed 115, as best shown in Figure 5. The link 130 is guided by a bearing pin 134 carried by the chuck post 105. The lever 127 is biased to retracted position by a leaf spring 132 that is anchored at 133 to the table 2 and the link 130 has a slot 135 surrounding the lever pivot 129 to permit complete retraction of the lever 127 even though the bed 115 is not completely retracted because of a lens L interposed between the posts 124 and chuck 97.

The lever 127 is completely retracted so that it may be locked during drilling operation. The lever 127 is provided with a notch 136 for the reception of a latch 137 carried by a lever 138 that is mounted on the side of the base 1 by a pivot 139, as shown in Figures 2, 5 and 14. The lever 138 is biased to inoperative position as shown in Figure 2, by a spring 140 anchored to the base 1 at 141. An extension 142 of the lever 138 protrudes through the path of the drill carriage lifting lever 31 so that when the lever 31 is lowered to move the carriage to operative position, the lever 31 will engage and depress the extension 142 to swing the lever 138 to move the latch 137 up into the notch 136 of the lever 127. Therefore, the support 99 cannot be moved while the drill is in operative position. If desired, the latch lever 138 may be limited in its movement by a spaced pair of stops 143 and 144.

Although a certain specific embodiment of the invention has been shown and described, it is obvious that many modifications thereof are possible. The invention, therefore, is not to be restricted except in so far as is necessitated by the prior art and by the spirit of the appended claims.

What I claim as new is:

1. A lens drilling machine comprising a support including work-holding means, a drill carriage supported by said support for movement relative to said work-holding means, said drill carriage including a drill-carrying shaft, means for moving said drill carriage between an operative position with the drill shaft in close juxtaposition to the work in said holding means and an inoperative position spaced from the work-holding means, means resiliently feeding the drill shaft to the work in said holding means when said drill shaft is in operative position and mechanism for progressively limiting the resilient feeding of said drill shaft toward the work in said holding means when said carriage is moved to operative position.

2. A machine as in claim 1 wherein said mechanism includes means for axially reciprocating the drill shaft while in operative position and comprising a driven shaft journalled on said drill carriage, a cam fixed on said driven shaft, and a cam abutment on said support and engageable by said cam.

3. A machine as in claim 2 wherein said cam abutment of said reciprocating means comprises a freely journalled roller and said mechanism to progressively limit feed of the drill shaft comprises a cam coaxial with said roller and engageable with an abutment on said drill carriage to limit movement of said carriage toward the work, and drive means between said roller and said coaxial cam, whereby said coaxial cam is driven by said roller when the roller is driven by engagement with said drill carriage cam.

4. A machine as in claim 3, wherein said coaxial cam is a spiral cam that is freely journalled on said support independently of said roller, said drive means between said roller and spiral cam comprising friction means effective to drive said cam from said roller, but permitting relative rotation therebetween, said spiral cam comprising a radial shoulder engageable with said carriage abutment to limit the operation of said spiral cam to a single cycle for each operation of said moving means to move said carriage and drill shaft to operative position.

5. A machine as in claim 4, wherein said mechanism includes means for resetting said spiral cam to present its maximum radius to said carriage abutment upon operation of said moving means.

6. A machine as in claim 1, wherein said drill shaft comprises driving means, and said mechanism includes means drivingly connected with said drill shaft and driven thereby.

7. A machine as in claim 1 wherein said mechanism is operative only when said drill carriage is moved by said means to operative position.

8. A lens drilling machine comprising a support including work holding means, a carriage slidably mounted on said support, a drill shaft carried by said carriage for movement toward and from said work holding means, means for moving said carriage between operative and inoperative positions, a lubricant reservoir pivotally carried by said support for movement about a substantially horizontal axis; and having a discharge spout at one end, and a connection between said drill carriage and said reservoir to oscillate said reservoir and swing the spout carrying end of said reservoir up and down to respectively raise and lower said spout above and below liquid level in said reservoir as the carriage is moved to inoperative or operative positions.

9. A lens drilling machine comprising a support including work holding means, a carriage slidably mounted on said support, a drill shaft carried by said carriage for movement toward and from said work holding means, means for moving said carriage between operative and inoperative positions, means for reciprocating said carriage when in operative position, a lubricant reservoir pivotally carried by said support for movement about a substantially horizontal axis; and having a drip spout at one end, and a connection between said reservoir and said drill shaft to oscillate said reservoir and swing the spout carrying end of said reservoir up and down to respectively raise and lower said spout above and below liquid level in said reservoir as the drill carriage is moved by said moving means and also with the reciprocation of said drill shaft to supply lubricant a drop at a time.

10. In a lens drilling machine including a support, a carriage supporting a drill shaft carried by said support, and work-holding means for holding a lens in drilling relation to said drill shaft, the improvement in said work-holding means comprising means for engaging the edge portion of a lens to position the lens relative to the drill shaft, a conical rest aligned with the drill shaft for supporting the bottom of the lens under the drill, and a resiliently mounted universally self-adjustable presser pad movable with the drill carriage for engaging the top of the lens and holding it down on said rest.

11. In a lens drilling machine including a support, a carriage supporting a drill shaft carried by said support, and work-holding means for holding a lens in drilling relation to said drill shaft, the improvement in said work-holding means comprising a fixed chuck for engaging one edge of a lens, and a self-aligning support including a slidable bed, a supporting member pivotally mounted on said bed for free pivotal movement about an axis perpendicular to the movement of said bed, and a pair of posts on said supporting member on opposite sides of and substantially parallel to the pivotal axis of said supporting member and for engaging the opposite side of the lens, said posts comprising spaced radial flanges for selectively receiving the lens edge therebetween.

12. A machine as in claim 11 wherein said sliding bed is resiliently biased toward lens-supporting position and manually movable in the opposite direction by a lever, a lost motion connection between said bed and lever, and a spring biasing said lever to retracted position, and a latch cooperative with said lever to lock said lever against movement, said latch being biased from said lever and movable by said carriage moving means to engage said lever when said carriage is moved to operative position.

JUSTO ANTONIO DE ARMAS.

References Cited in the file of this patent

UNITED STATES PATENTS

| Number | Name | Date |
| --- | --- | --- |
| 365,419 | Welsh | June 28, 1887 |
| 1,141,859 | Bader et al. | June 1, 1915 |

FOREIGN PATENTS

| Number | Country | Date |
| --- | --- | --- |
| 55,472 | Germany | Feb. 28, 1891 |